S. B. CHILDS.
Car Wheel.
No. 58,216.
Patented Sept. 25, 1866.
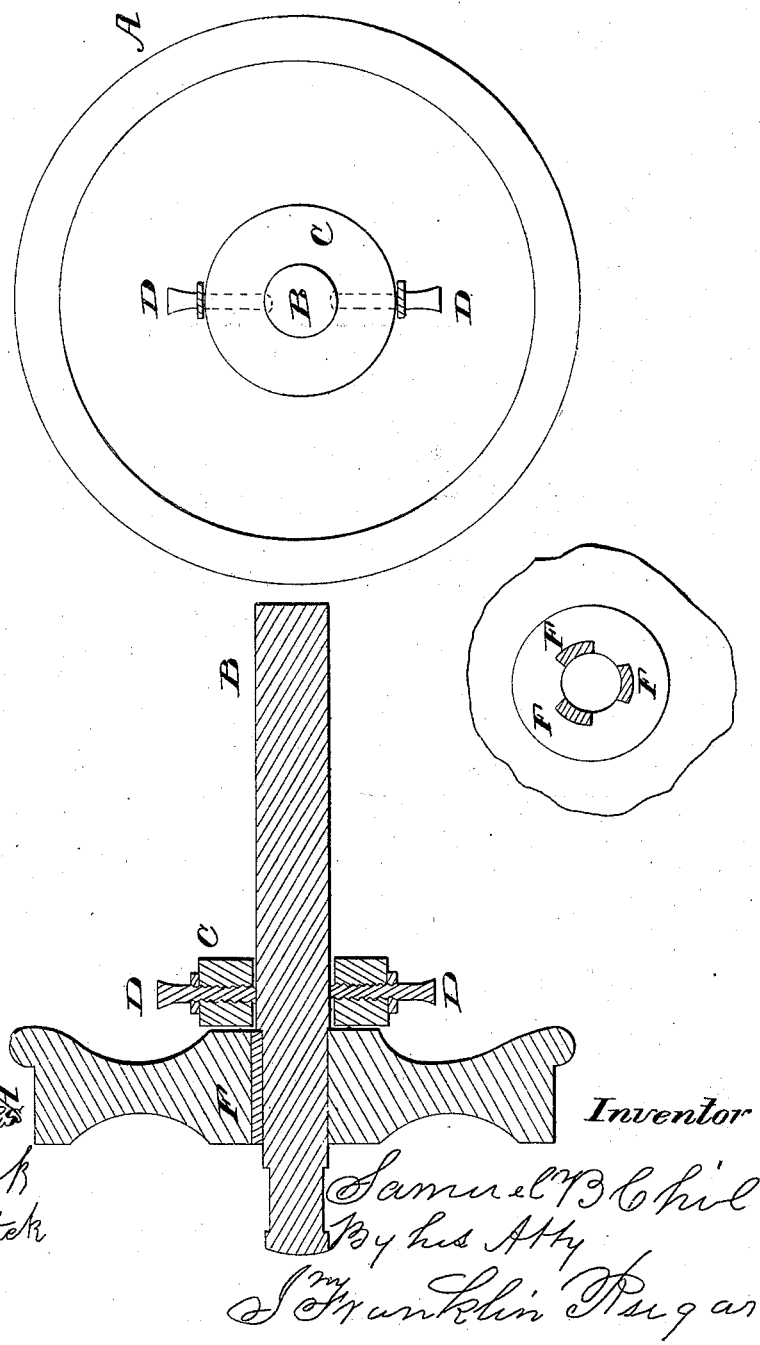
Witnesses
D. R. Hickok
Stephen Ustick
Inventor
Samuel B Childs
By his Atty
J Franklin Reigart

UNITED STATES PATENT OFFICE.

SAMUEL B. CHILDS, OF SYRACUSE, NEW YORK.

IMPROVEMENT IN RUNNING-GEAR OF RAILWAY-CARS.

Specification forming part of Letters Patent No. 58,216, dated September 25, 1866.

*To all whom it may concern:*

Be it known that I, SAMUEL B. CHILDS, of Syracuse, Onondaga county, New York, have invented new and useful Improvements in the Running-Gear of Railway-Cars; and I do hereby declare the following to be an exact description thereof, reference being had to the accompanying drawings and to the letters of reference marked thereon, making a part of this specification.

Figure 1 represents the car-wheel with the collar on the axle; Fig. 2, a cross-section; Fig. 3, the brass wedges in the center of the wheel.

The nature of my invention is an independent wheel, that only operates independently when it reaches a curve, by means of an adjustable collar on the axle, and brass or hard-metal wedges in the hub of the wheel.

A represents the solid cast-iron car-wheel, having three or more brass or hard-metal wedges, F, driven in tightly into mortises in the center of the hub of the wheel, so that the axle B does not wear the center of the wheel, but the wedges can be at any time renewed in case the least wear becomes perceptible, and wheel always runs perfectly true.

C is an iron loose collar on the axle, that is tightened to the axle by set-screws D, the screws fitting in slight grooves in the axle, so that the collar is adjustable at any time necessary, and, as the collar fits closely to the hub of the wheel, the wheel is always kept true and upright, and cannot get loose or wabble, and the collar is the size of the hub, so that the wheel and axle run together on a straight line, but the moment the wheel reaches a curve it yields to the friction against the rail, and travels independently and with freedom on the curve.

Another advantage is, my improvement can be attached to the present and ordinary car-wheels and axles at a trifling expense.

What I claim as my invention, and desire to secure by Letters Patent, is—

The adjustable collar C, and set-screw D, and the metallic wedges or box F in the wheel, when arranged and combined with the car-axle, as herein described, and for the purposes set forth.

SAML. B. CHILDS.

Witnesses:
A. S. MARTIN,
C. S. MARTIN.